May 25, 1965 J. J. AMODEI ETAL 3,185,864

TUNNEL DIODE SHIFT REGISTER WITH AUTOMATIC RESET

Filed April 27, 1962

3 Sheets-Sheet 1

INVENTORS
JUAN J. AMODEI &
JOSEPH R. BURNS

BY John V. Regan

Attorney

TUNNEL DIODE SHIFT REGISTER WITH AUTOMATIC RESET

Filed April 27, 1962 3 Sheets-Sheet 2

INVENTORS
JUAN J. AMODEI &
JOSEPH R. BURNS
BY John V. Regan
Attorney

May 25, 1965 J. J. AMODEI ETAL 3,185,864

TUNNEL DIODE SHIFT REGISTER WITH AUTOMATIC RESET

Filed April 27, 1962 3 Sheets-Sheet 3

INVENTORS
JUAN J. AMODEI &
JOSEPH R. BURNS
BY John V. Regan
Attorney

United States Patent Office 3,185,864 Patented May 25, 1965

3,185,864

TUNNEL DIODE SHIFT REGISTER WITH AUTOMATIC RESET

Juan J. Amodei, Levittown, Pa., and Joseph R. Burns, Trenton, N.J., assignors to Radio Corporation of America, a corporation of Delaware Filed Apr. 27, 1962, Ser. No. 190,756
15 Claims. (Cl. 307—88.5)

This invention relates to shift registers and to circuits useful therein.

A binary shift register may be defined as a device having a number of cascaded binary storage elements. Information stored in the register is shifted one position during each shift cycle in response to one or more shift pulses, with the result that a signal indicative of the preshift state of a storage element is applied at the input of the next adjacent storage element for switching that next element to the same state at the end of the cycle. It generally is necessary to provide interim storage in the coupling between storage elements to prevent dropout or loss of information bits during the shift cycle. The particular type of interim storage employed determines, in part. the maximum operating speed and reliability of the register.

Dynamic interim storage provided by capacitors or inductors has the advantages of simplicity and high speed, but introduces restrictions on the duration of the shift pulse. The shift pulse must terminate before the capacitor discharges or the energy stored in the inductor decays. Bistable interstage coupling is more reliable, and operation is "asynchronous" in the sense that no restrictions are imposed on the duration of the shift pulse. However, in known prior art devices which use the latter type of interim storage, this reliability is achieved at the expense of a complex shift pulse arrangement, which includes means for resetting the bistable coupling circuits, and a resulting reduced shifting rate.

It is desirable to provide a shift register which uses bistable interim storage means without an accompanying reduction in the shifting rate, which requires only one externally supplied shift pulse for shifting information, and in which the components of the individual stages operate at high speed both in response and in recovery time.

A shift register having these desirable features is provided according to the present invention, wherein each stage preferably includes a first tunnel diode-transistor bistable circuit for "permanent" storage and a second tunnel diode-transistor bistable circuit for interim storage and coupling. The output of each interim storage circuit is direct current coupled to the input of the next succeeding permanent storage circuit. The output of each permanent storage circuit is fed back to the input of the preceding interim storage circuit through the series combination of a capacitor and a unidirectional conducting device. The latter device is poled to pass signals having a polarity to reset the interim storage circuit when the permanent storage circuit is switched to the set state.

It is one feature of the invention that the input and output of a permanent storage circuit are of opposite relative phase, while the input to and output from an interim storage, or coupling, circuit are of the same relative phase. Both circuits are settable by an input of the same polarity. Accordingly, when a shift pulse is applied to reset a previously set permanent storage circuit, the output thereof changes in a direction to immediately set the next succeeding interim storage circuit. The output of this interim storage circuit changes in a direction to set the following permanent storage circuit at the termination of the shift pulse. When the last-mentioned permanent storage circuit is switched from the reset to the set state, its output is fed back through unidirectional conducting means to the input of the interim storage circuit, and resets that circuit.

In the accompanying drawings, like reference characters refer to like components, and:

Figure 1:
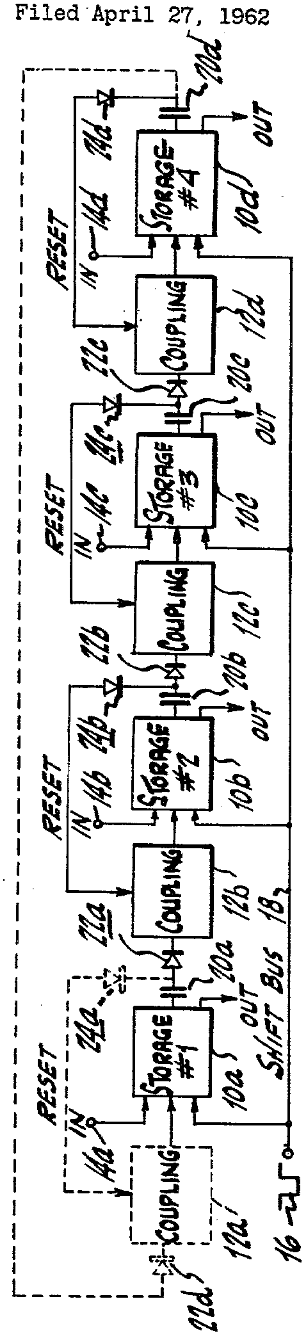
FIGURE 1 is a block diagram of a shift register according to the invention.

A four bit binary shift register is illustrated in block form in FIGURE 1. The blocks 10*a* . . . 10*d* labelled "storage" are binary circuits employed as permanent storage elements. The term "permanent" is used here in a restricted sense to indicate that these circuits 10*a* . . . 10*d* provide the main memory or storage for the register, as opposed to the interim storage provided by the bistable interstage coupling circuits 12*a* . . . 12*d*. The register may be operated as a parallel-to-serial register, a serial-to-parallel register, or as a ring counter. These portions of the register shown by dashed lines are employed only when the register is operated as a ring counter.

Each of the storage circuits 10*a* . . . 10*d* has an input terminal 14*a* . . . 14*d*, respectively, to which input information signals may be applied from an external source or sources (not shown). The input of each of the storage circuits 10*a* . . . 10*d* also is direct current coupled to the output of the preceding coupling circuit 12*a* . . . 12*d*, respectively. As mentioned previously, the coupling circuit 12*a* is used only when the register is operated as a ring counter. Shift pulses 16 for resetting all of the storage circuits 10*a* . . . 10*d* are applied to a common shift bus 18, which is connected to the input of each of the storage circuits 10*a* . . . 10*d*. Each of the storage circuits also has an output terminal, labelled "out," for sampling the stored information.

Other connections to each of the storage circuits 10*a* . . . 10*d* and associated interstage coupling circuits are similar, and a description of the first stage will suffice as a description of all. The output of the first storage circuit 10*a* is coupled to the input of the next succeeding coupling circuit 12*b* by the series combination of a capacitor 20*a* and a unidirectional conducting device, illustrated as a diode 22*a*. A second diode 24*a* is connected in a feedback loop from the junction of the capacitor 20*a* and first diode 22*a* to the input of the next preceding coupling circuit 12*a*. First diode 22*a* is poled in a direction to pass only those output signals from the first storage circuit 10*a* which have the proper polarity for switching the coupling circuit 12*b* to the set state. Second diode 24*a* is poled in a direction to pass only those output signals which have the proper polarity to reset the preceding coupling circuit 12*a*.

It is assumed that the set state of a storage circuit represents storage of a binary "1," and that the reset state represents storage of a binary "0." The set and reset states of a coupling circuit have the same significance, respectively. A circuit, either a storage circuit or a coupling circuit, is set in response to a positive-going input pulse or signal, and is reset in response to a negative-going pulse or signal.

A storage circuit, 10*a* for example, may be switched from the reset to the set state either by a positive-going output pulse from the preceding coupling circuit 12*a* or by a positive-going signal applied at its input terminal 14*a*. A negative-going shift pulse 16 resets the storage circuits 10*a* . . . 10*d*. The output of the storage circuit 10*a* has the opposite relative phase to that of its input, being low when set by a positive-going signal and high, relatively speaking, when reset by a negative-going signal. The output of a coupling circuit, 12*b* for example, has the same relative phase as its last input. That is to say, the output goes high when the circuit is set by a positive-going set pulse; the output goes low, relatively speaking, when a negative-going pulse resets the circuit.

Consider the operation of the register as a serial-to-parallel shift register. Initially, all of the storage circuits 10*a* . . . 10*d* and coupling circuits 12*b* . . . 12*d* are in the reset state. The coupling circuit 12*a* is omitted from the register or otherwise rendered inoperative. Assume that a positive pulse is applied at the input terminal 14*a*. This pulse switches the first storage circuit 10*a* to the set state, and the output thereof goes low. Diode 22*a* blocks this output pulse. Next shift pulse 16 resets the first storage circuit 10*a*, and a positive-going output signal is coupled by the capacitor 20*a* and diode 22*a* to set the coupling circuit 12*b*. The output of the coupling circuit 12*b* now is high and is of the proper amplitude and polarity to set the second storage circuit 10*b*. Shift pulse 16, however, overpowers the output of the coupling circuit 12*b* and prevents setting of the second storage circuit 10*b* for the duration of the shift pulse 16.

No information loss or drop-out occurs in the coupling circuit 12*b* regardless of the duration of the shift pulse 16 because the coupling circuit 12*b* is bistable. The high output of the coupling circuit 12*b* sets the second storage circuit 10*b* immediately upon termination of the shift pulse 16. The output of the second storage circuit 10*b* then falls in a negative direction, and the negative-going output pulse is fed back through the capacitor 20*b* and diode 24*b* to reset the coupling circuit 12*b*. Preferably, the capacitor 20*b* and the input circuitry of the coupling circuit 12*b* (or 12*c*) act as a differentiating network for the output pulse. The negative-going output of the coupling circuit 12*b* is ineffective to reset the second storage circuit 10*b*. A second input now may be applied at the input terminal 14*a*, and the shift cycle repeated. Information is read out of the register in parallel at all of the terminals marked "out."

It is thus seen that this register has the reliability afforded in prior art registers employing bistable interstage coupling, regardless of shift pulse duration. Prior art registers of this type, however, require an external shift pulse for resetting the coupling circuits, and the output of a prior art coupling circuit does not set the succeeding storage circuit until a shift pulse resets the coupling circuit. The FIGURE 1 register eliminates both the need for the complex prior art shift pulse source and the delay in setting a storage circuit from the output of a coupling circuit. Thus, the FIGURE 1 register has the reliability of prior art registers employing bistable interim storage and the speed of prior art registers employing dynamic interim storage.

Operation of the FIGURE 1 register as a parallel input, serial output register is similar to that described above, except that information signals are applied in parallel to selected ones of the input terminals 14*a* . . . 14*d*, and the stored information is read out serially at the "out" terminal of the last storage circuit 10*d*.

The coupling circuit 12*a* and diodes 22*d* and 24*a* are operatively connected in the register when the register is operated as a ring circuit such as a ring counter. Assume that the first storage circuit 10*a* is set. The first shift pulse 16 resets the first storage circuit 10*a* and shifts the "1" bit to the second storage circuit 10*b*. The fourth storage circuit 10*d* is set at the termination of the third shift pulse 16, and its output goes low, resetting the coupling circuit 12*d*. The fourth shift pulse 16 resets the fourth storage circuit 10*d* and the output thereof goes high. The positive-going output pulse is fed back to the input of the coupling circuit 12*a*, by way of the capacitor 20*d* and diode 22*d*, and sets this coupling circuit 12*a*. The high output of the coupling circuit 12*a* sets the first storage circuit 10*a* at the termination of the shift pulse 16, and the negative-going output of the first storage circuit 10*a* resets the coupling circuit 12*a* by way of the feedback loop.

Figure 2:
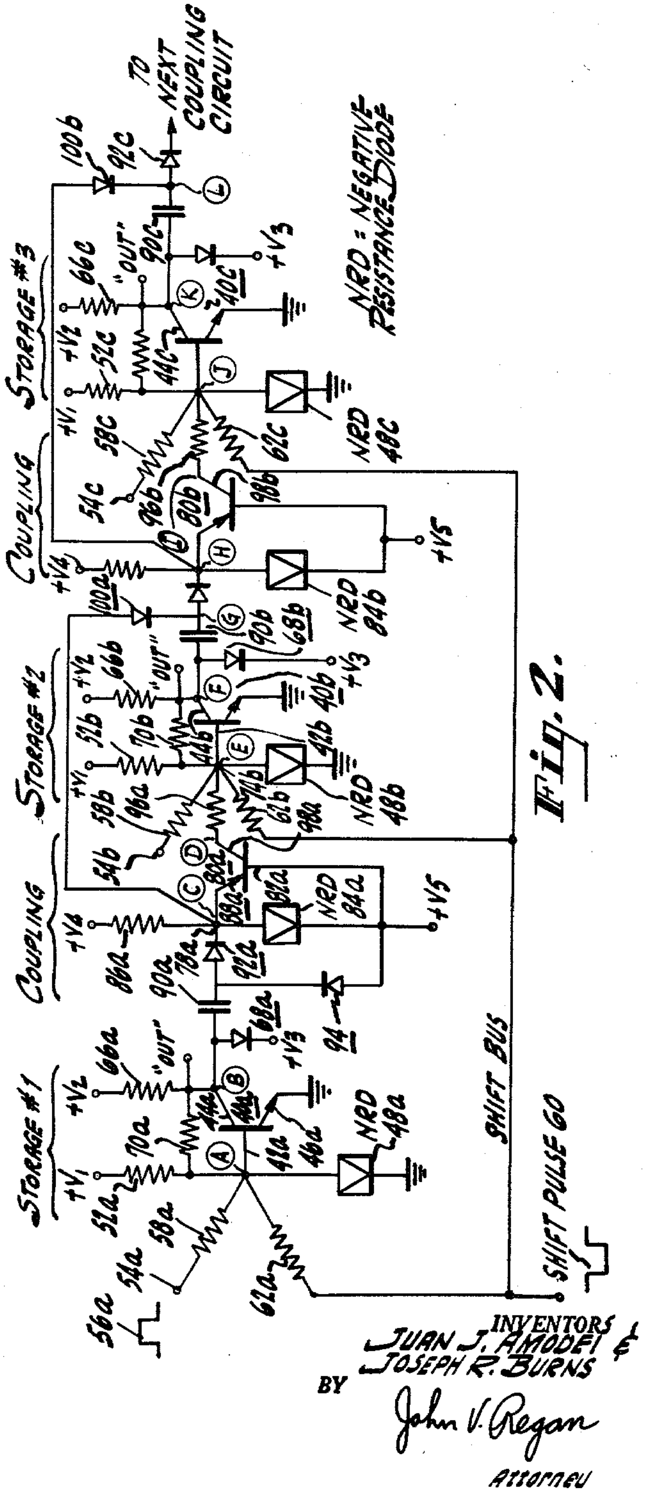
FIGURE 2 is a schematic diagram of a shift register according to the invention.

FIGURE 2 is a schematic diagram of a preferred form of the shift register. The circuitry for three storage circuits and two interstage coupling circuits is given by way of example. The first storage circuit includes an NPN transistor 40*a* connected in the common emitter configuration, and having base 42*a*, collector 44*a* and emitter 46*a* electrodes. A negative resistance diode (NRD) 48*a* is connected in parallel with the emitter-base diode of the transistor 40*a*. A suitable negative resistance diode 48*a* is one whose volt-ampere characteristic is defined by two regions of positive resistance separated by a region of negative resistance and wherein the voltage is a multi-valued function of the current.

Preferably, the negative resistance diode 48*a*, and others to be described, is a tunnel diode, in which case the anode thereof is connected to the base electrode 42*a* and the cathode is connected to the emitter electrode 46*a* and to a point of reference potential, indicated by the conventional symbol for circuit ground. Tunnel diode 48*a* is forward biased by a source of substantially constant current comprising a resistor 52*a* and a source of voltage, designated $+V_1$. The voltage source may be, for example, a battery (not shown) having its positive terminal connected to the upper end of the resistor 52*a* and having its negative terminal grounded. The values of the resistor 52*a* and voltage source $V_1$ are selected so that the tunnel diode is biased for bistable operation, as will be described more fully hereinafter. With respect to the base 42*a*, both the tunnel diode 48*a* and the emitter-base diode of the transistor 40*a* conduit forward current in the same direction.

Positive information input pulses 56*a*, for switching the tunnel diode 48*a* to the set state, may be applied at a first input terminal 54*a*. An input resistor 58*a* is connected between the input terminal 54*a* and the anode of the tunnel diode 48*a*. Negative shift pulses 60 for resetting the tunnel diode 48*a* are applied to the anode by way of a resistor 62*a*.

A source of collector bias voltage $+V_2$ is connected to the collector electrode 44*a* by a resistor 66*a*. A diode 68*a* clamps the collector 44*a* voltage at a value of approximately $+V_3$ volts when the transistor 40*a* is nonconducting, and a feedback resistor 70*a* supplies current to the tunnel diode 48*a* when the clamp diode 68*a* is conducting. This feedback current is in a direction to increase the forward current through the tunnel diode 48*a* and, as will be seen later, is effective to reduce the current output requirements of the shift pulse source in resetting the tunnel diodes 48*a* . . . 48*c*. Information stored in the first storage circuit may be sampled at the output terminal designated "out."

The first interstage coupling circuit includes a PNP transistor 80*a* connected in the common base configuration. The base electrode 82*a* and the cathode of a tunnel diode 84*a* are connected to a source of positive bias voltage, designated $+V_5$. A resistor 86*a* and a voltage source $+V_4$ supply substantially constant current to the junction 78*a* of the anode of the tunnel diode 84*a* and the emitter electrode 88*a* of the transistor 80*a*. This current has a value to bias the tunnel diode 84*a* for bistable operation. A capacitor 90*a* and a unidirectional conducting device, illustrated as a diode 92*a*, are serially connected between the output (collector electrode 44*a*) of the transistor 40*a* in the preceding storage circuit, and the anode of the tunnel diode 84*a*. The diode 92*a* is poled in a direction to pass only positive-going output signals from the first storage circuit for switching the tunnel diode 84*a* to the set state. Because of the relatively low impedance of the tunnel diode 84*a*, the diode 84*a* and capacitor 90*a* act as a differentiating network to differentiate the positive-going output of the first storage circuit. A diode 94 has its cathode connected to a point intermediate capacitor 90*a* and diode 92*a*, and has its anode connected to a voltage of $+V_5$ volts. This diode 94 provides a discharge path for the capacitor 90*a*. A resistor 96*a* direct current couples the collector electrode 98*a* of the transistor 80*a* and the anode of the tunnel diode 48*b* in the second storage circuit.

The othe coupling circuit, between the second and third storage circuits, is structurally similar to the coupling circuit described above, the like components being designated by like reference numerals followed by the alphabetical character "*b*." A diode 100*a* is connected in a feedback loop from the junction of capacitor 90*b* and diode 92*b*, at the output of the second storage circuit, to the anode of the tunnel diode 84*a* in the preceding coupling circuit. A similar diode 100*b* is connected in a feedback loop from the output of the third storage circuit to the anode of the tunnel diode 84*b* in the second coupling. Each of these diodes 100*a* and 100*b* is poled to pass current in a direction to reset the tunnel diodes 84*a* and 84*b*, respectively. Each of the diodes 100*a*, 100*b* also provides a discharge path for its respective capacitor 90*b*, 90*c*, whereby the diode 94 of the first storage stage is unnecessary in the second and third storage circuits. The combination of capacitor 90*b* and tunnel diode 84*a* acts to differentiate negative-going output pulses, as does the combination of capacitor 90*c* and tunnel diode 84*b*. Except for the above noted differences, the second and third storage circuits are structurally similar to the first storage circuit, and like components are designated by like reference numerals followed by the alphabetic characters "*b*" and "*c*," respectively.

Figures 3, 4:
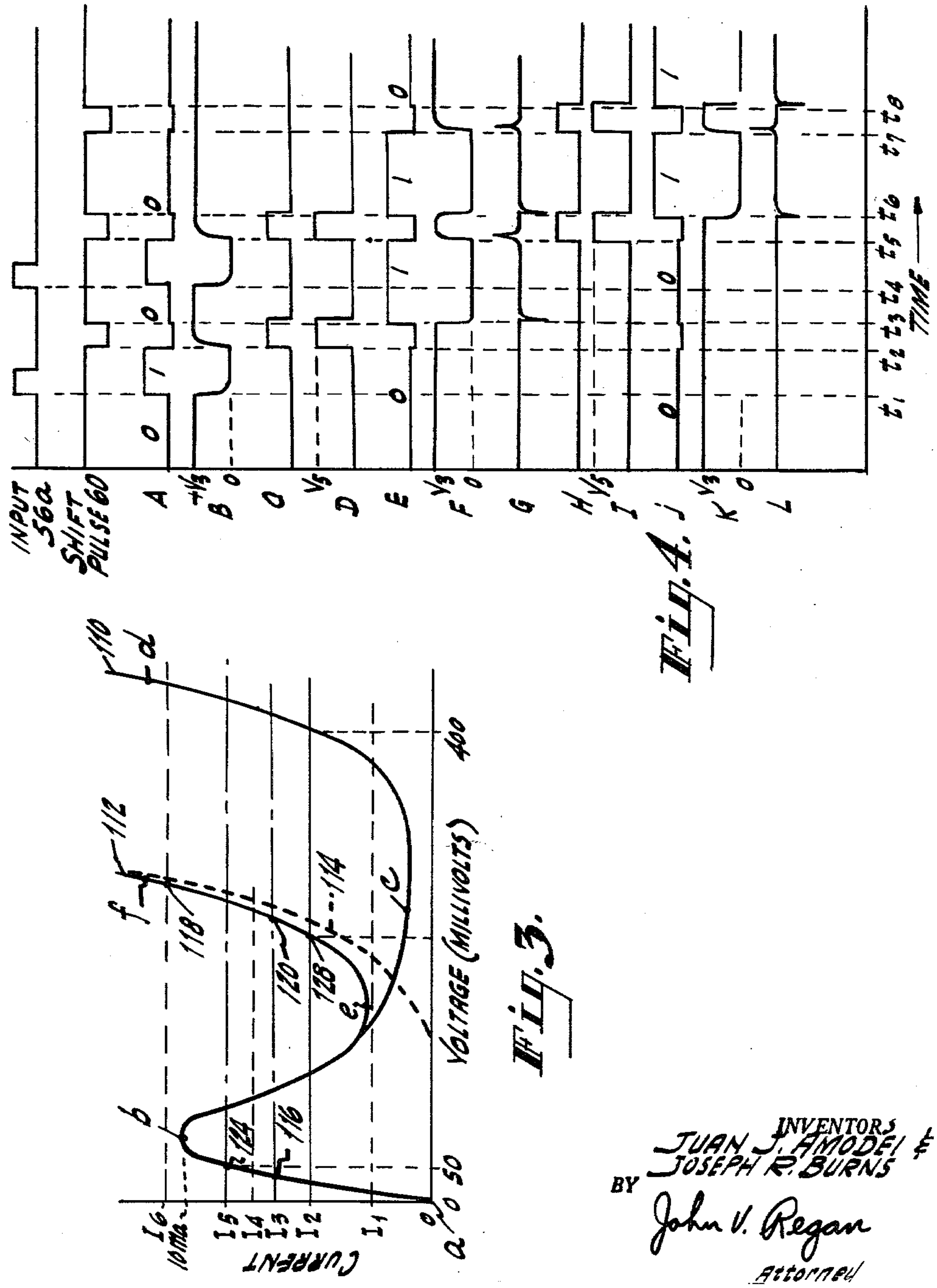
FIGURE 3 is a set of volt-ampere characteristics useful in describing the operation of the circuitry of FIGURE 2.
FIGURE 4 is a timing diagram for the FIGURE 2 shift register.

Operation of the shift register circuits may best be understood from a consideration of the operating characteristics of FIGURE 3. Solid curve 110 is the volt-ampere characteristic for each of the tunnel diodes 48, 84, where voltage plotted along the abscissa represents the voltage across the tunnel diode and the current plotted along the ordinate represents the current flowing through the tunnel diode. The particular voltage and current values given are for a germanium tunnel diode having a peak current *b* of ten milliamperes. Curve 110 is typical for all of the tunnel diodes 48 and 84 of FIGURE 2. The tunnel diode characteristic 110 has a first region *ab* of positive resistance at a relatively low voltage, a region *bc* of negative resistance at intermediate values of voltage, and a second region *cd* of positive resistance at high voltage, relatively speaking.

Dashed curve 114 is the volt-ampere characteristic for each of the transistors 40, 80, as seen looking between base and emitter, assuming the transistor saturates at a value of input current which is low compared to the peak current of the tunnel diode. The collector saturation currents in FIGURE 3 are adjusted to meet this condition by proper selection of the collector bias supplies and collector resistors. Curve 114 may be shifted to the left or right, relative to the curve 110, as may be required for optimum operation, by adding a voltage in series with the emitter-base diode of the transistor or in series with the tunnel diodes. For example, assume that the transistor 40*a* is a silicon transistor. The conducting threshold of such a transistor may be approximately 0.6 volt, which is greater than the maximum normal voltage across the germanium tunnel diode 48*a*. The volt-ampere characteristic of the transistor may be shifted to the left in FIGURE 2, to the position shown by the dashed curve 114, by connecting the emitter electrode 46*a* to a source of negative supply voltage (not shown) of the proper value. Connecting the emitter 46*a* to a negative voltage lowers the conducting threshold of the transistor 40*a*.

Since each of the tunnel diodes 48*a* . . . 48*c* and 84*a* . . . 84*c* is connected in parallel with the base-emitter diode of its respective transistor 40*a* . . . 40*c* and 80*a* . . . 80*b*, the same voltage appears across each. A combined volt-ampere characteristic 112 for each such combination may be drawn by adding the tunnel diode and transistor input currents at the same voltage. The solid curve *abef* is the typical, combined volt-ampere characteristic for each tunnel diode-transistor combination of FIGURE 2.

Consider now the operation of the coupling circuits, and refer in particular to the first coupling circuit as illustrative of both. The bias source $V_4$ and resistor 86*a* serve as a constant current source supplying a current $I_3$ to the junction point 78*a* at the anode of the tunnel diode 84*a*. When the circuit is first energized, all of this current $I_3$ flows, in the conventional sense, into the anode of the tunnel diode 84*a*, and the operating point on the combined characteristic 112 is the point 116 (FIGURE 2). Note that the current $I_3$ is about half-way between the values of current corresponding to the peak *b* and valley *e* points on the combined operating characteristic 112. The set and reset input currents required then are approximately equal. The reasons for this choice will become apparent as the discussion proceeds.

The voltage across the emitter-base diode of the transistor 80*a* at this time is insufficient to bias the transistor 80*a* into conduction. Accordingly, no collector 98*a* current flows through the resistor 96*a* to the tunnel diode 48*b* in the suceeding storage stage, and the voltage at the collector electrode 98*a* now is at its lowest value. In this sense, the input to and output from the coupling circuit are in phase; i.e., the output is low when the last applied input is low.

A positive input current supplied through the diode 92*a* and having a value of approximately $I_6-I_3$ raises the tunnel diode 84*a* current above the peak value *b*, and switches the tunnel diode 84*a* through its negative resistance region. The operating point then is the point 118 on the combined operating curve 112. At the termination of the input pulse, the total current into the tunnel diode 84*a* and emitter 88*a* drops to $I_3$, and the operating point is the point 120. As may be seen in FIGURE 3, a current of approximately $I_2$ flows into the emitter 88*a*. Collector saturation current flows through the resistor 96*a*, raising the collector 98*a* voltage to a value of approximately $+V_4$ volts, and supplying forward current to the tunnel diode 48*b* in the second storage circuit. The latter current is sufficient to switch the tunnel diode 48*b* to the high voltage state. The tunnel diode 84*a* is reset in response to a negative input current of $I_3-I_1$ or greater.

Consider now the operation of the storage circuits and refer in particular to the second storage circuit. The voltage source $V_1$ and resistor 52*b* combination supplies a constant current $I_2$ to the junction point 74*b*. Note that this current has a value closer to that of the valley *e* than to the peak *b*. This choice is made to reduce the reset current requirement imposed on the shift pulse source (not shown), since this source must supply sufficient current to reset all of the tunnel diodes 48*a* . . . 48*c* in the storage circuits in the worst case.

Assume that the tunnel diode 48*b* is in the low voltage state and that the tunnel diode 84*a* in the preceding coupling circuit also is in the low voltage state. No current then is supplied from the transistor 80*a*. The current $I_2$ flows into the tunnel diode 48*b* in its entirety and the transistor 40*b* is nonconducting. The collector 44*b* voltage is clamped at $+V_3$ volts by the diode 68*b*. Resistor 70*b* supplies feedback current of value $I_5-I_2$ milliamperes from the collector 44*b* to the tunnel diode 48*b* raising the quiescent current through the tunnel diode 48*b* to a value of $I_5$ milliamperes in the reset condition. The stable operating point in the low voltage, or reset, state is the point 124. The feedback current has the effect of reducing the current required to switch the tunnel diode 44b from the reset to the set state from a value of approximately $I_6-I_2$ to a value of approximately $I_6-I_5$. Stated in another way, the feedback current permits a much larger turn-on overdrive for the transistor 40b for the same increment of input current.

Tunnel diode 48b may be switched to the high voltage state by a positive increment of input current $I_6-I_5$. The transistor 40b then saturates and the collector 44b voltage falls to approximately ground potential, reverse-biasing the clamp diode 68b and cutting off the feedback current through the resistor 70b. The total current supplied to the tunnel diode 48b and base 42b is $I_2$ milliamps at the termination of the input pulse, and the stable operating point in the high voltage, or set, state of the tunnel diode 48b is the point 128 in FIGURE 3. A storage circuit may be considered as storing a binary "1" bit in this condition. Note that the output voltage at the collector 44b falls in a negative direction in response to a positive input pulse. In this sense, the output and input are of opposite sense.

The combination of the tunnel diode 84a, in the preceding coupling circuit, diode 100a and capacitor 90b serves as a differentiating network for the drop in voltage at the collector 44b when the transistor 40b turns on. Diode 92b is reverse-biased by the voltage change. The negative current supplied to the tunnel diode 84a is of sufficient magnitude to switch that tunnel diode 84a from the set to the reset state. Each shift pulse 60 supplies a negative current of at least $I_2-I_1$ milliamperes to the anode of the tunnel diode 48b and is sufficient to reset the tunnel diode 48b.

Operation of the FIGURE 2 circuitry as a serial-to-parallel shift register will now be described with reference to the timing diagram of FIGURE 4. The waveforms on the timing diagram are those which appear at like designated points in FIGURE 2. All of the tunnel diodes 48a . . . 48c and 84a, 84b initially are in the reset state, and none of the transistors 40a . . . 40c and 80a, 80b conducts.

A first input pulse 56a of current, representing a binary "1" bit of information, is applied at input terminal 54a at $t_1$. This pulse 56a switches the tunnel diode 48a from the stable state of low voltage (row A) to the stable state of high voltage, and the transistor 40a saturates. The collector 44a voltage (row B) falls from $+V_3$ volts to zero volts. The first storage stage now is storing a binary "1."

A first shift pulse 60 is applied at the anodes of all of the tunnel diodes 48a . . . 48c at $t_2$ and supplies negative current to these diodes. This negative current resets the tunnel diode 48a (row A) and turns off the transistor 40a. The voltage (row B) at the collector 44a rises to $+V_3$ volts, and a positive pulse of current is supplied through diode 92a to the tunnel diode 84a, switching this tunnel diode 84a to the high voltage state (row C). Transistor 80a then saturates (row D) and supplies positive current to the tunnel diode 48b in the second storage circuit. Shift pulse 60 is still present at this time and the negative current supplied by this shift pulse 60 prevents the tunnel diode 48b from switching.

At the termination of the shift pulse 60 at $t_3$, the collector 98a current switches the tunnel diode 48b to the high voltage state (row E) and turns on the transistor 40b. The voltage (row F) at the collector 44b of transistor 40b falls from $+V_3$ volts to zero volts, and a negative pulse of current (row G) is fed back through capacitor 90b and diode 100a to reset the tunnel diode 84a shortly after $t_3$. The second storage circuit now is storing a binary "1" and the first and third storage circuits are storing a binary "0."

A second positive input pulse 56a of current is supplied at the input terminal 54a at $t_4$. This pulse sets the tunnel diode 48a (row A) and turns on the transistor 40a. A second shift pulse 60 resets tunel diodes 48a and 48b at $t_5$. Transistors 40a and 40b then turn off and the collector 44a and 44b voltages (rows B and F, respectively) rise from zero to $+V_3$ volts. A positive-going output at the collector 44a of transistor 40a sets the tunnel diode 84a and turns on transistor 80a. The positive-going output at the collector 84b of transistor 40b sets the tunnel diode 84b (row H) and turns on the transistor 80b (row I). At the termination of the shift pulse 60 at $t_6$, the transistors 80a and 80b supply positive currents to set the tunnel diodes 48b (row E) and 48c (row J), respectively. Transistors 40b and 40c saturate and the voltages at their collectors 44b and 44c, respectively (rows F and K) fall to zero volts. Shorlty after $t_6$, a negative pulse of current (row G) is fed back through diode 100a to reset the tunnel diode 84a. In like manner, a negative pulse of current (row L) is fed back through diode 100b to reset the tunnel diode 84b. Each of the second and third storage circuits now stores a binary "1."

A third shift pulse 60 is applied to all of the tunnel diodes 48a . . . 48c at $t_7$ and resets the tunnel diodes 48b and 48c, turning off the respective transistors 40b and 40c. The positive-going output (row F) at the collector electrode 44b sets the tunnel diode 84b in the second coupling circuit. A positive pulse of current (row L) at the output of the third storage circuit is supplied to the next succeeding coupling circuit (not shown) through diode 92c. At the termination of the shift pulse 60 at $t_8$, the transistor 80b supplies a positive current through resistor 96b to set the tunnel diode 48c in the third storage circuit. Transistor 40c then saturates and the negative-going output (row K) supplies a negative pulse of current (row L) to reset the tunnel diode 84b by way of diode 100b. A binary "1" bit now is stored in the third storage circuits and binary "0" bits are stored in the first and second circuits.

Information may be read out of the register in parallel by sampling the voltages at the terminals labelled "out" at the collector electrodes 44a . . . 44c. Alternatively, the stored information may be read out serially by sampling the voltage at the "out" terminal of the last storage circuit.

Figure 5:
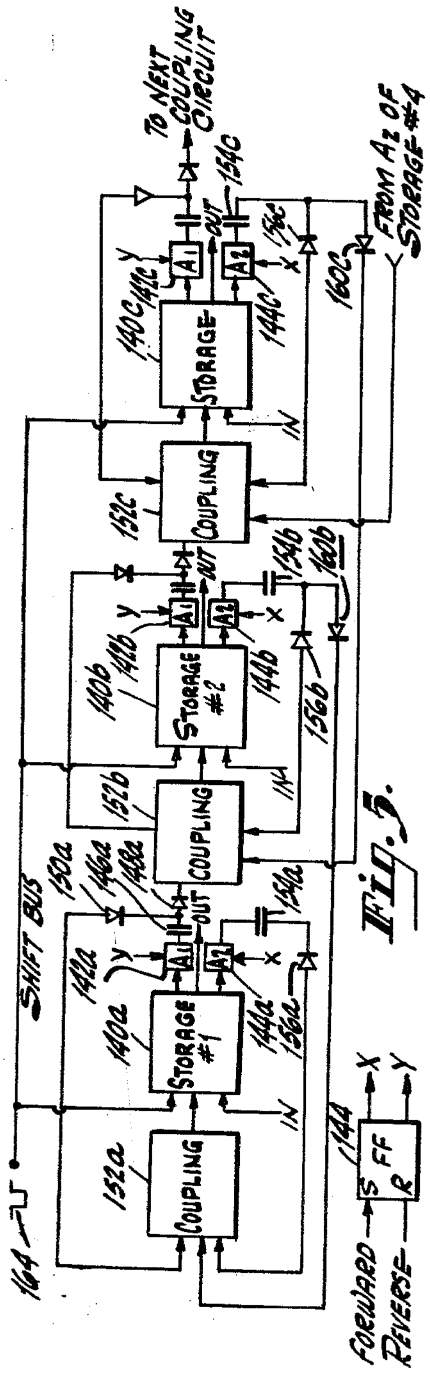
FIGURE 5 is a block diagram of a reversible shift register according to the invention.

A block diagram of a reversible shift register according to the invention is illustrated in FIGURE 5. This shift register is similar to the register illustrated in FIGURE 1 and described previously with the following exceptions. The output of the first storage circuit 140a is applied to one input of each of a pair of two input gates 142a, 144a. The second inputs to the gates 142a, 144a are supplied from a flip-flop 144. Flip-flop 144 is arranged so that one of its outputs X or Y is of the proper amplitude and polarity to enable its respective gate 142a, 144a, respectively, while the other output of the flip-flop 144 disables its respective gate.

The output of the gate 142 is connected by the series combination of a capacitor 146a and diode 148a to the input of the next succeeding coupling circuit 152b. This diode 148a is poled in a direction to pass signals having a polarity to set the coupling circuit 152b. A diode 150a is connected in a feedback loop from the junction of capacitor 146a and diode 148a to the input of the next preceding coupling circuit 152a. Diode 150a is poled in a direction to pass signals having a polarity to reset the coupling circuit 152a.

The output of the second gate 144a is connected to the input of the preceding coupling circuit 152a by the series combination of a capacitor 154a and diode 156a. Diode 156a is poled in a direction to pass signals having a polarity to reset the coupling circuit 152a. The second storage circuit 140b is similar to the first storage circuit 140a except that the output of the gate 144b is connected to the input of the second preceding coupling circuit 152a through the series combination of the capacitor 154b and a diode 160b. Likewise, the output of the gate 144c in the third storage circuit 140c is applied to the input of the second preceding coupling circuit 152b by the series combination of a capacitor 154c and a diode 160c. Diodes 160b and 160c are poled in a direction to pass signals of a polarity to set the coupling circuits 152b and 152c, respectively.

The direction of shifting is determined by the condition of the flip-flop 144. Assume that the output Y has the proper amplitude and polarity to enable the gates 142a . . . 142c. A positive-going output of a storage circuit, 140a for example, then is passed through the first gate 142a, capacitor 146a and diode 148a to set the coupling circuit 152b, when a shift pulse 164 resets the storage circuit. Gates 144a . . . 144c are disabled at this time time by the X input. Switching the flip-flop 144 to the other stable state enables the gates 144a . . . 144c and disables the gates 142a . . . 142c. The positive output of a storage circuit, 140b, for example, then passes through the gate 144b, capacitor 154b and diode 160b to set the coupling circuit 152a, when the second storage circuit 140b is reset by a shift pulse 164. Assuming that the coupling circuit 152b also is set at this time by the output of the third storage circuit 140c, the coupling circuit 152b output again sets the second storage circuit 140b at the termination of the shift pulse 164. The negative-going output of the second storage circuit 140b is fed back by way of gate 144b, capacitor 154b and diode 156b to reset the coupling circuit 152b.

It is thus seen that information is shifted in a first direction when the flip-flop 144 is in a first state and is shifted in the opposite direction when the flip-flop 144 is in the opposite stable state.

Figure 6:
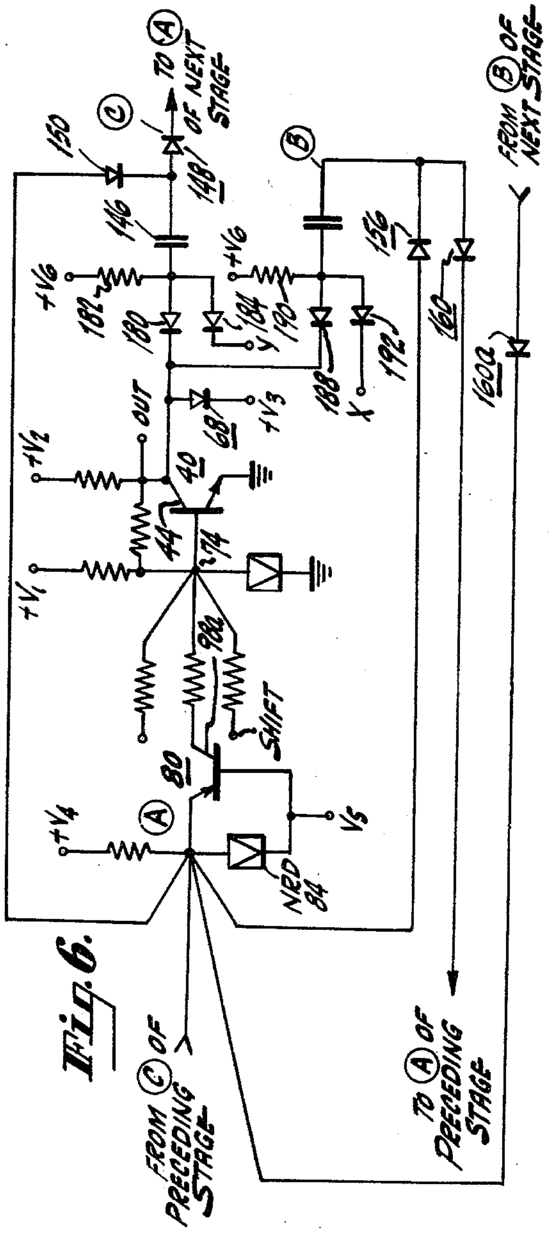
FIGURE 6 is a schematic diagram of a preferred coupling and storage circuit arrangement for use in the reversible shift register.

A schematic diagram of the circuitry for one stage of the FIGURE 5 register is illustrated in FIGURE 6. With the exception of the output coupling of the storage circuit and the inputs to the coupling circuit, the circuit is the same as that given in FIGURE 3, both in structure and operation. Accordingly, only the differences are described in detail hereinafter. Components like those in FIGURE 2 are designated by like reference numerals. The collector electrode 44 of transistor 40 is connected to the cathodes of a pair of diodes 180 and 188. The anode of diode 180 is connected to one terminal of a capacitor 146 and, by way of a resistor 182, to a source of voltage designated $+V_6$. A second diode 184 has its anode connected to the capacitor 146 and has its cathode connected to the output designated "Y" of the flip-flop 144 (FIGURE 5). Diode 150 is connected in a feedback loop from the other terminal of the capacitor 146 to the anode of the tunnel diode 84 in the coupling circuit of the same stage. A diode 148 is connected between the capacitor 146 and the anode of the tunnel diode (not shown) in the next succeeding stage.

The anode of diode 188 is connected to one terminal of a capacitor 154 and through a resistor 190 to the source of bias $+V_6$. A diode 192 has its cathode connected to the X output of the flip-flop 144 (FIGURE 5) and has its anode connected to the one terminal of the capacitor 154. Diode 156 is connected between the other terminal of the capacitor 154 and the anode of the tunnel diode 84 in the coupling circuit of the same stage. Another diode 160 is connected between the same terminal of the capacitor 154 and the anode of the tunnel diode (not shown) in the coupling circuit of the next preceding stage. Points in the other stages to which the illustrated stage is connected are identified by alphabetic characters corresponding to like points in the illustrated stage, for easy identification.

The operation of the gates will now be described. It is assumed that the voltages X and Y are either zero volts or $+V_3$ volts and that Y is $+V_3$ volts when X is zero volts, and vice versa. When Y is zero volts, the voltage at the anode of diode 184 is clamped at this potential regardless of the voltage at the collector electrode 44. No signals then are coupled by the capacitor 146. When the voltage at Y is $+V_3$ volts, and the transistor 40 is nonconducting, the collector voltage 44 is clamped at $+V_3$ volts by the diode 68, and the voltage at the anodes of diodes 180 and 184 is approximately $+V_3$ volts. The collector 44 voltage drops to zero volts when transistor 40 saturates. Diode 180 then clamps the voltage at the anodes of the diodes 180 and 184 at zero volts and reverse-biases the diode 184. A negative-going signal then is passed by the capacitor 146 and the diode 150 to reset the tunnel diode 84.

Consider now the operation of the circuit and assume that Y is $+V_3$ volts and X is zero volts. The lower gate then is ineffective to pass output signals, and information is shifted from left to right, as viewed in the drawing, in response to shift pulses. Assume that the tunnel diode 48 is in the set state. The voltage at the anode of diode 180 then is zero volts. The next shift pulse resets the tunnel diode 48 and turns off the transistor 40. The voltage at the collector 44 rises to $+V_3$ volts as does the voltage at the anode of diode 180. A positive pulse is passed by the capacitor 146 to the anode of the tunnel diode in the next succeeding coupling circuit. If the tunnel diode 84 is set at this time by a positive output from the preceding stage, the transistor 80 supplies positive current to again set the tunnel diode 48 at the termination of the shift pulse. Transistor 40 then saturates and the voltage at the collector 44 drops to zero. A negative signal is coupled by the capacitor 146 and diode 150 to reset the tunnel diode 84 in the coupling circuit.

Assume now that the state of the flip-flop 144 (FIGURE 5) is changed and that X is now $+V_3$ volts and Y is zero volts. The upper gate then is disabled. When a shift pulse is applied at the anode of the tunnel diode 48 to reset the diode, transistor 40 turns off, and the voltage at the collector 44 rises to $+V_3$ volts. A positive signal then is coupled through the capacitor 154 and diode 160 to set the tunnel diode (not shown) in the coupling circuit of the next preceding stage. If the storage circuit in the next succeeding stage were set prior to the shift pulse, a positive signal is applied through the diode 160a to set the tunnel diode 84 when the shift pulse is applied. At the termination of the shift pulse, the transistor 80 supplies positive current for setting the tunnel diode 48. Transistor 40 then turns on, the collector voltage drops to zero volts, and a negative signal is fed back through the capacitor 154 and diode 156 to reset the tunnel diode 84 in the coupling circuit of the same stage.

Although the various circuits illustrated in the drawings are shown as employing NPN transistors in the storage circuits and PNP transistors in the coupling circuits, it will be understood that this constitutes no limitation on the present invention. PNP transistors may be used in the storage circuits and NPN transistors in the coupling circuits, provided that the connections to all of the conventional diodes and tunnel diodes are reversed, and provided further that the polarities of all of the bias voltages are reversed.

By way of example only, the values of the various components in one operative embodiment according to FIGURE 2 were as follows:

| | |
|---|---|
| $V_1$ | 6 volts. |
| $V_2$ | 20 volts. |
| $V_3$ | 2.5 volts. |
| $V_4$ | 20 volts. |
| $V_5$ | 2.5 volts. |
| Transistor 40 (emitter 46 connected to ≈−0.5 volt) | 2N709. |
| Transistor 80 | 2N769. |
| Resistor 52 | 1K ohm. |
| Resistor 66 | 1K ohm. |
| Resistor 70 | 1K ohm. |
| Resistor 86 | 2.2K ohms. |
| Resistor 96 | 510 ohms. |
| Capacitor 90 | 4.7 $\mu\mu$ farad. |
| Diodes 68, 92, 100 | MA4121. |

What is claimed is:

1. The combination comprising:

a plurality of bistable circuits connected in cascade and each having an input and an output;

direct current conducting means connecting the outputs of alternate ones of said circuits to the inputs of the next succeeding other ones of said circuits;

first unidirectional conducting means connecting the outputs of said other circuits to the inputs of the next succeeding ones of said alternate circuits, said first unidirectional conducting means being poled to pass output signals of a first polarity;

and second unidirectional conducting means connecting the outputs of said other circuits to the inputs of the next preceding ones of said alternate circuits, said second unidirectional conducting means being poled to pass output signals of a second polarity opposite to said first polarity.

2. The combination comprising:

a plurality of bistable circuits connected in cascade and each having an input and an output;

direct current conducting means connecting the outputs of alternate ones of said circuits to the inputs of the next succeeding other ones of said circuits;

first unidirectional conducting means connecting the outputs of said other circuits to the inputs of the next succeeding ones of said alternate circuits, said first unidirectional conducting means being poled to pass output signals of a first polarity;

second unidirectional conducting means connecting the outputs of said other circuits to the inputs of the next preceding ones of said alternate circuits, said second unidirectional means being poled to pass output signals of a second polarity, opposite to said first polarity;

and means for applying shift pulses to the input of each of said other circuits.

3. An N stage register comprising:

N bistable storage circuits each having an input and an output;

bistable circuit means interconnecting said storage circuits and each having an input and an output;

a number of capacitors each having one terminal connected to the said output of a different one of said storage circuits, first unidirectional means each connected between the other terminal of a different one of said capacitors and the input of the next succeeding one of said interconnecting circuit means, and second unidirectional conducting means each connected between the said other terminal of a different one of said capacitors and the input of the next preceding one of said interconnecting circuit means, each of said first unidirectional conducting means being poled to pass signals of one polarity and each of said second unidirectional conducting means being poled to pass signals of the opposite polarity;

and direct current conducting means connecting the output of each of said interconnecting circuit means to said input of the next succeeding one of said storage circuits.

4. A shift register comprising:

a plurality of cascaded bistable circuits, each having an input, an output, a stable set state and a stable reset state, alternate ones of said circuits being storage circuits and the remaining ones of said circuits being interstate coupling circuits for said storage circuits, each of said bistable circuits being settable in response to a signal of a first polarity applied at its said input and being resettable in response to a signal of a second, opposite polarity applied at its said input, a number of capacitors each connected to the output of a different one of said storage circuits, first unidirectional conducting means each connected between a different one of said capacitors and the input of the next succeeding one of said coupling circuits, said first unidirectional conducting means being poled to pass signals of said first polarity, second unidirectional conducting means each connected between a different one of said capacitors and the input of the next preceding one of said coupling circuits, said second unidirectional conducting means being poled to pass signals of said second polarity, and direct current conducting means connecting the output of each of said coupling circuits to the input of the next succeeding one of said storage circuits.

5. A shift register comprising:

a plurality of cascaded bistable circuits each having an input, an output a stable set state and a stable reset state, alternate ones of said circuits being storage circuits and the remaining ones of said circuits being interstage coupling circuits for said storage circuits, each of said bistable circuits being settable in response to an input signal of a first polarity applied at its input and being resettable in response to an input signal of a second, opposite polarity, applied at its input, a number of capacitors each connected to the output of a different one of said storage circuits, first unidirectional conducting means each connected between a different one of said capacitors and the input of the next succeeding one of said coupling circuits, said first unidirectional conducting means being poled to pass signals of said first polarity, second unidirectional conducting means each connected between a different one of said capacitors and the input of the next preceding one of said coupling circuits, said second unidirectional conducting means being poled to pass signals of said second polarity, direct current conducting means connecting the output of each of said coupling circuits to the input of the next succeeding one of said storage circuits, and means for applying information signals selectively to at least one of said storage circuits from an external source.

6. A shift register comprising:

a plurality of cascaded bistable circuits each having an input, an output, a stable set and a stable reset state, alternate ones of said circuits being storage circuits and the remaining ones of said circuits being interstage coupling circuits for said storage circuits, each of said bistable circuits being settable in response to an input signal of a first polarity applied at its input and being resettable in response to an input signal of a second, opposite polarity applied at its input, a plurality of capacitors each connected to the output of a different one of said storage circuits, first unidirectional conducting means each connected between a different one of said capacitors and the input of the next succeeding one of said coupling circuits, said first unidirectional conducting means being poled to pass signals of said first polarity.

second unidirectional conducting means each connected between a different one of said capacitors and the input of the next preceding one of said coupling circuits, said second unidirectional conducting means being poled to pass signals of said second polarity, direct current conducting means connecting the output of each of said coupling circuits to the input of the next succeeding one of said storage circuits, and means for applying shift pulses to the inputs of all of said storage circuits.

7. A shift register comprising:

a plurality of cascaded bistable circuits each having an input, an output, a stable set state and a stable reset state, alternate ones of said circuits being storage circuits and the remaining ones of said circuits being interstage coupling circuits for said storage circuits, each of said bistable circuits being settable in response to a signal of a first polarity applied at its said input and being resettable in response to a signal of a second, opposite polarity applied at its said input, a plurality of capacitors each connected to the output of a different one of said storage circuits, first unidirectional conducting means each connected between a different one of said capacitors and the input of the next succeeding one of said coupling circuits, said first unidirectional conducting means being poled to pass signals of said first polarity, second unidirectional conducting means each connected between a different one of said capacitors and the input of the next preceding one of said coupling circuits, said second unidirectional conducting means being poled to pass signals of said second polarity, direct current conducting means connecting the output of each of said coupling circuits to the input of the next succeeding one of said storage circuits, means for applying information signals selectively to at least one of said storage circuits from an external source, and means for applying shift pulses to the inputs of all of said storage circuits.

8. An N stage shift register comprising:

N bistable storage circuits each having an input and an output and being settable in response to a signal of a first polarity applied at its said input and being resettable in response to a signal of the opposite polarity applied at its said input, the input and output signals of a said storage circuit being of opposite relative phase, a number of bistable interstage coupling circuits connecting said storage stages in cascade and each having an input and an output, each of said coupling circuits being settable in response to an input signal of said first polarity and being resettable in response to an input signal of said opposite polarity, the input and output signals of each said coupling circuit being of the same relative phase, a number of capacitors each having one terminal connected at the output of a different one of said storage circuits, first unidirectional conducting means each connected between the other terminal of a different one of said capacitors and the input of the next succeeding one of said coupling circuits, said first unidirectional conducting means being poled to pass signals of said first polarity, second unidirectional conducting means each connected between the said other terminal of a different capacitor and the input of the next preceding one of said coupling circuits, said second unidirectional conducting means being poled to pass signals of said opposite polarity, and means connecting the output of each of said coupling circuits to the input of the next succeeding one of said storage circuits.

9. The shift register as claimed in claim 8 including means for applying shift pulses at the inputs of all of said storage circuits.

10. The combination comprising:

a first transistor of one conductivity type having input, output and common electrodes, a first negative resistance diode connected across said input and common electrodes;

means for biasing said first diode for bistable operation;

a second transistor of opposite conductivity type having input, output and common electrodes;

a second negative resistance diode connected across the input and common electrodes of said second transistor;

means for biasing said second diode for bistable operation;

a resistor connected between the output electrode of said first transistor and the input electrode of said second transistor;

and unidirectional conducting means connected in a feedback loop from the output electrode of said second transistor to the input electrode of said first transistor.

11. The combination comprising:

a first transistor of one conductivity type having input, output and common electrodes;

a first negative resistance diode connected across said input and common electrodes;

means for biasing said first diode for bistable operation;

a second transistor of opposite conductivity type having input, output and common electrodes;

a second negative resistance diode connected across the input and common electrodes of said second transistor;

means for biasing said second diode for bistable operation;

a resistor connected between the output electrode of said first transistor and the input electrode of said second transistor;

and unidirectional conducting means and a capacitor serially connected in a feedback loop from the output electrode of said second transistor to the input electrode of said first transistor.

12. The combination comprising:

a first transistor of one conductivity type connected in the common base configuration and having a base, a collector and an emitter;

a first tunnel diode connected across the base and emitter of said first transistor;

means for biasing said first tunnel diode for bistable operation;

a second transistor of opposite conductivity type connected in the common emitter configuration and having a base, an emitter and a collector;

a second tunnel diode connected across the base and emitter of said second transistor;

means for biasing said second tunnel diode for bistable operation;

a resistor connecting the collector of said first transistor to the base of said second transistor;

and a conventional diode connected between the collector of said second transistor and the emitter of said first transistor.

13. The combination comprising:

a first transistor of one conductivity type having a base, an emitter and a collector;

a first negative resistance diode having one electrode connected to said emitter and another electrode connected to said base;

means for biasing said diode for bistable operation, whereby said diode has a stable set state and a stable reset state;

a second transistor of the opposite conductivity type having a base, a collector and an emitter;

a second negative resistance diode connected across the base and emitter of said second transistor;

means for biasing said second diode for bistable operation;

bidirectional conducting means connecting the said collector of said first transistor to one electrode of said second diode;

and a unidirectional conducting means connected between the said collector of said second transistor and one electrode of said first diode, said unidirectional conducting means being poled to pass signals having a polarity to reset said first diode.

14. The combination comprising:

a first circuit including a first transistor of one conductivity type having input, output and common electrodes, a first negative resistance diode connected across said input and common electrodes of said first transistor, and means for biasing said first diode for bistable operation;

a second circuit including a second transistor of the opposite conductivity type, and having input, output and common electrodes, a second negative resistance diode connected across the input and common electrodes of said second transistor, and means for biasing said second diode for bistable operation;

a third circuit like said first circuit;

a capacitor and a first unidirectional conducting device serially connected between the output electrode of said first transistor and the input electrode of said second transistor, said first unidirectional conducting means being poled to pass signals having a polarity to switch said second diode from one stable state to the other stable state;

a second capacitor and a second unidirectional conducting device serially connected between the output electrode of the transistor in said third circuit and the said input electrode of said second transistor, said second unidirectional conducting device being poled to pass signals having a polarity to switch said second diode from said other stable state to said one stable state;

direct current conducting means connecting the output electrode of said second transistor to the input electrode of the transistor in said third circuit;

and means for applying input signals to the input electrode of said first transistor.

15. The combination comprising:

a first transistor having a base, an emitter and a collector and being connected in the common base configuration;

a negative resistance diode having a forward current-voltage characteristic defined by first and second regions of positive resistance separated by a region of negative resistance;

means connecting said diode across the emitter and base of said first transistor so that the direction of the forward diode current and the direction of easy current flow across the emitter-base junction of the transistor are the same relative to a point common to the diode and the emitter;

means connected to the negative resistance diode for biasing the diode bistably, whereby said diode has a first stable state and a second stable state;

a second transistor of opposite conductivity type having a base, an emitter and a collector and being connected in the common emitter configuration;

a resistor connected between the collector of the first transistor and the base of the second transistor;

means for selectively applying input signals to the diode having a polarity to switch the diode to the second stable state; and unidirectional conducting means connected between the collector of the second transistor and said diode, and being poled to pass signals having a polarity to switch the diode to the first stable state.

References Cited by the Examiner

UNITED STATES PATENTS

| | | | |
|---|---|---|---|
| 2,773,983 | 12/56 | Baker et al. | 328—49 |
| 2,918,574 | 12/59 | Gimpel et al. | 328—127 |
| 2,922,985 | 1/60 | Crawford | 328—37 |
| 3,097,312 | 7/63 | Miller | 307—88.5 |
| 3,102,209 | 8/63 | Pressman | 307—88.5 |

OTHER REFERENCES

"Tunnel Diode Manual," General Electric Co., copyright March 20, 1961, page 46, FIG. 5.4 relied on.

JOHN W. HUCKERT, *Primary Examiner.*

DAVID J. GALVIN, *Examiner.*